June 23, 1953 R. L. RISING 2,642,927
HEADREST FOR AUTOMOBILES
Filed May 6, 1952 2 Sheets-Sheet 1
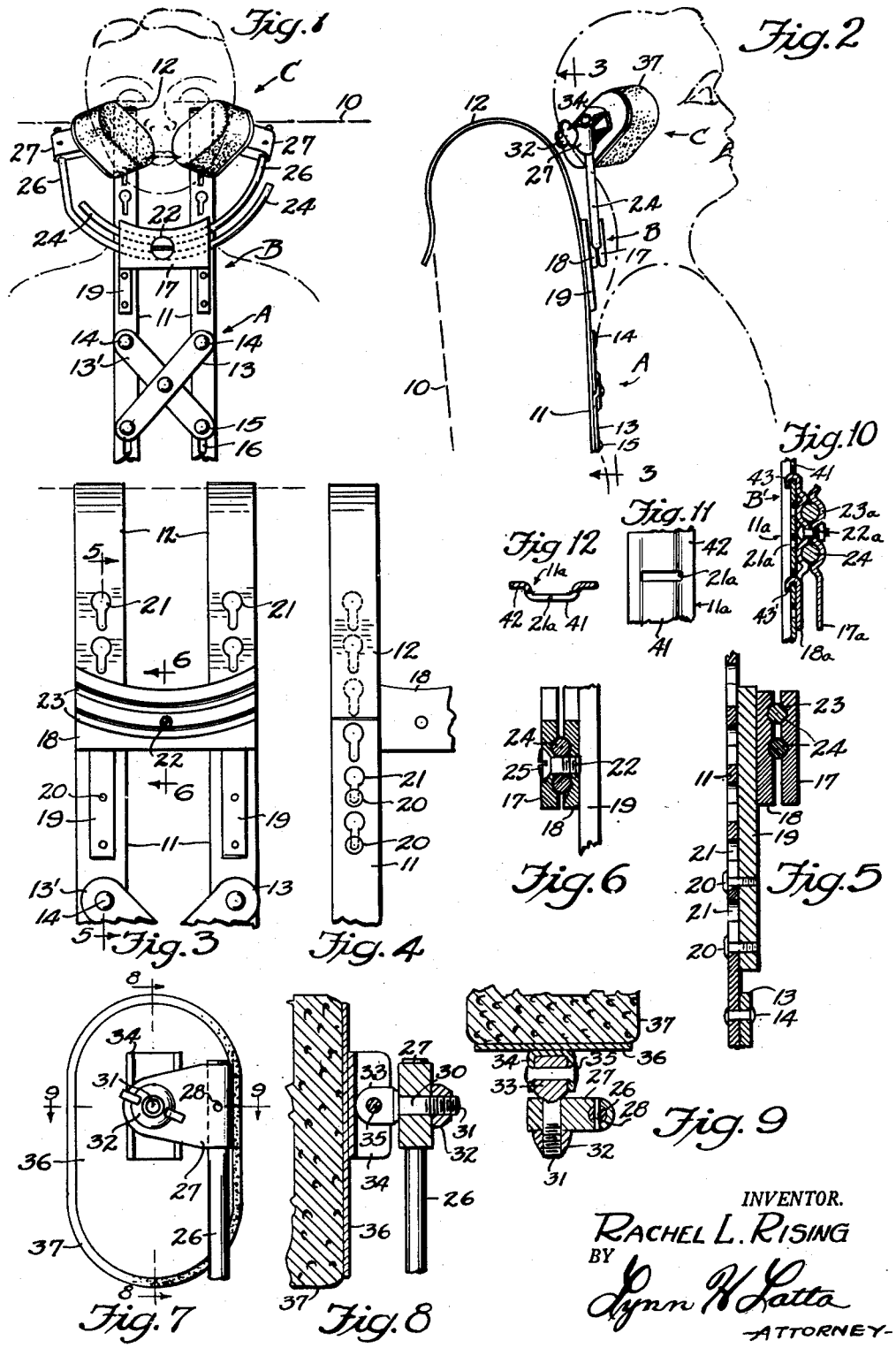
INVENTOR.
RACHEL L. RISING
BY
Lynn H Latta
ATTORNEY

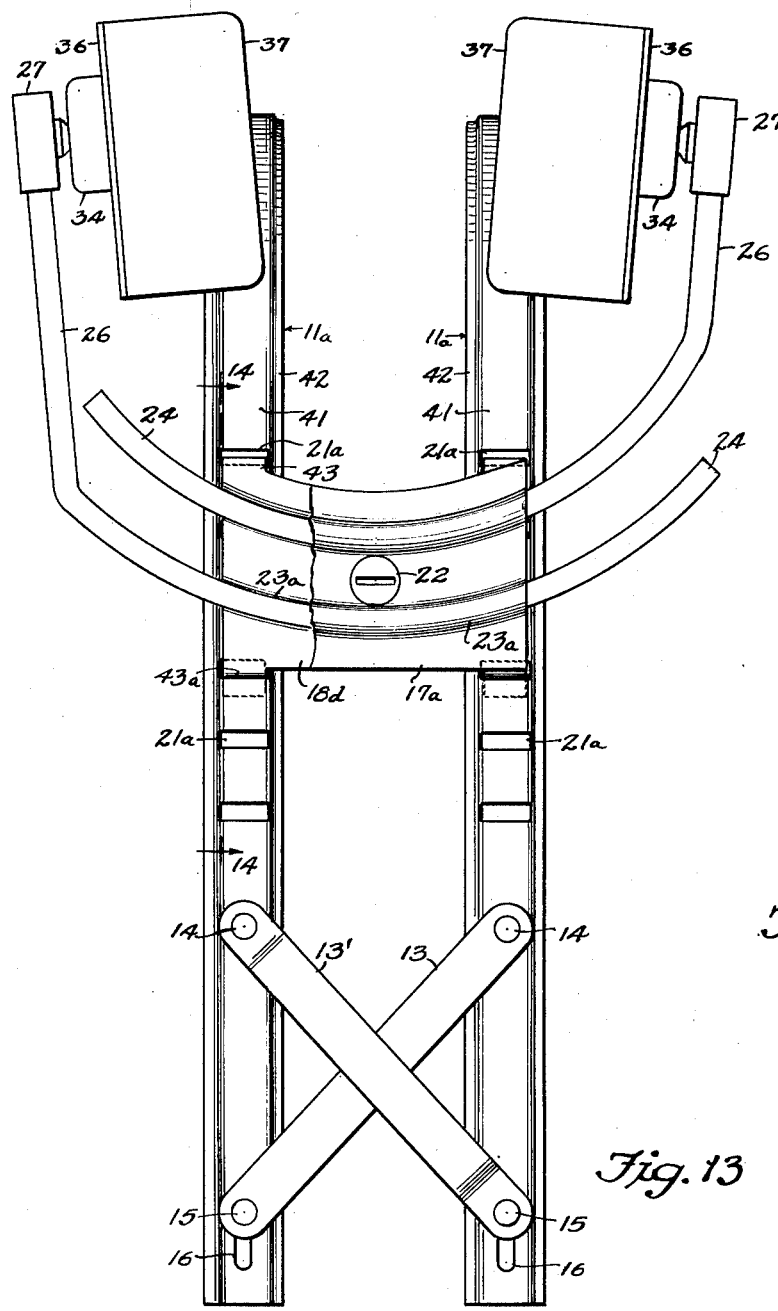

Patented June 23, 1953

2,642,927

UNITED STATES PATENT OFFICE 2,642,927

HEADREST FOR AUTOMOBILES

Rachel L. Rising, Los Angeles, Calif.

Application May 6, 1952, Serial No. 286,260

6 Claims. (Cl. 155—174)

This invention relates to head rests, the general object thereof being to provide a head rest for use in an automotive vehicle. More specifically, the invention aims to provide, as an attachment for the back of an automobile seat, a head rest adapted to support the back of a passenger's head against lateral swaying movement.

A particular object of the invention is to provide a head rest that may be used by a passenger while sleeping or napping in a sitting up position in a travelling automobile, with adequate support to restrain the head from swaying sidewise in response to the sidewise pull of centrifugal force developed when the vehicle is rounding a turn in the road. The invention is also useful in providing added support for the head of a driver, diminishing the development of fatigue in the neck muscles where the head is maintained in an erect position for long periods of time.

A further object is to provide such a head rest, having means for adjusting the same to the head.

Another object is to provide such a head rest, having collapsible means for attaching the same to the back of a vehicle seat.

A further object is to provide such a head rest, which is of relatively simple an inexpensive yet durable construction.

Other objects will become apparent in the ensuing specification and appended drawings in which:

Fig. 1 is a front elevational view of a head rest embodying the invention, with the seat and a passenger, utilizing the head rest, being indicated in broken lines.

Fig. 2 is a side elevational view of the same.

Fig. 3 is a vertical sectional view taken on the line 3—3 of Fig. 2, showing the supporting unit in elevation;

Fig. 4 is a fragmentary rear view of the supporting unit;

Fig. 5 is a detail sectional view of the mounting bracket, taken on line 5—5 of Fig. 3;

Fig. 6 is a detail sectional view of the mounting bracket, taken on line 6—6 of Fig. 3;

Fig. 7 is a detail view of the rear side of one of the head rest cushions and its mounting;

Fig. 8 is a sectional view taken on the line 8—8 of Fig. 7;

Fig. 9 is a detail sectional view taken on the line 9—9 of Fig. 7;

Fig. 10 is a sectional view of a modified form of the supporting and bracket units, taken longitudinally through one of the supporting straps;

Fig. 11 is a fragmentary face view of one of the modified supporting straps;

Fig. 12 is a transverse sectional view of the same, taken through one of the slots therein;

Fig. 13 is a front view of a further modified form of the invention with a portion of the forward clamp jaw broken away; and Fig. 14 is a sectional view taken on the line 14—14 of Fig. 13.

Referring now to the drawings in detail, the invention provides a head rest apparatus which includes generally a supporting unit A for attachment to the back of an automobile seat (indicated in broken lines at 10); a mounting bracket unit B which has means for detachably securing the same to the supporting unit A; and a pair of head rest cushion units C which are adjustably mounted in the bracket unit B.

Supporting unit A includes a pair of straps 11 the upper ends of which are formed with hooks 12 of the proper dimensions and shape to receive the upper portion of seat back 10 as indicated in Fig. 2. The lower ends of straps 11 are joined by a lazy-tong structure comprising a pair of cross bars 13, 13' each having one end pivoted, by means of a rivet or bolt or the like 14, to a respective strap 11 and each having its other end connected to the opposite strap 11 by a combined sliding and pivotal connection including a pivot 15 extending through said other end of the cross bar and through a longitudinal slot 16 in the respective strap 11. Cross bars 13 function, in cooperation with bracket unit B, to maintain straps 11 in spaced parallel relationship, while allowing the straps 11 to be collapsed into side by side relation when the device is to be stored (bracket unit B being first detached).

Bracket unit B comprises a pair of clamp jaws 17, 18, the latter secured to a pair of legs 19 each having a pair of longitudinally spaced headed studs 20 secured therein. Studs 20 are receivable in bayonet slots 21 in straps 11, there being a series of slots 21 arranged along the longitudinal axis of each strap 11. The longitudinal spacing of bayonet slots 21 corresponds to that of studs 20, whereby each pair of studs 20 may be mounted in a corresponding pair of adjacent slots 21. The studs are locked into the slots by shifting them downwardly into the narrow lower portions of slots 21. For detaching bracket unit B from straps 11, studs 20 are shifted upwardly until the heads thereof register with the circular enlarged upper portions of slots 21, the heads of the studs being slightly smaller in diameter than such circular slot portions so that they may pass therethrough.

Clamp jaws 17, 18 are provided with corresponding arcuate grooves 23. Grooves 23 are substantially semi-circular in cross section and the grooves of one clamp plate cooperate with the other to define toroidal passages in which are received the arcuate rod members 24 of the respective head cushion units C. Grooves 23 and rod members 24 are curved upon circular arcs, so that the rod members 24 may slide freely in grooves 23 when clamp jaws 17, 18 are not clamped against the rod members.

The positions of rod members 24 may be fixed by clamping them between jaws 17, 18; a clamp screw 22 being provided for this purpose. Clamp screw 22 extends rotatably through jaw 17 and is threaded into jaw 18 as illustrated in Fig. 6. It has a flush head 25 with a screw driver slot of a proper size to receive the edge of a coin, for tightening the screw.

Each of the arcuate rod members 24 has an upwardly projecting arm 26 which extends through and is secured to a bearing block 27 (as by means of a pin 28—Fig. 9). Rotatably mounted in bearing block 27 is a stud 30 having a threaded end 31 onto which is threaded a thumb nut 32. At its other end, stud 30 has a head 33 which extends into a channel 34 and is pivoted thereto by a pivot pin 35. Head 33 bears against one side of bearing block 27. Nut 32 may be tightened against the other side of bearing block 27 to secure stud 30 in any position of rotatable adjustment in the bearing block.

Secured to channel 34, in any suitable manner, as by spot welding, is a back plate 36 for a head cushion 37, the latter being of sponge rubber or any suitably equivalent material. Cushion 37 is bonded to back plate 36 and is thereby supported in adjustable relation to arm 26, the two pivots 30 and 35 cooperatively providing a universally adjustable connection between the cushion and the supporting arm 26.

It will now be apparent that, by loosening clamp screw 22 and sliding arcuate rod members 24 between the clamp plates 17, 18, the cushion 37 may be adjusted both for height and lateral spacing. For example, by sliding the upper rod member 24 in a clockwise direction and the lower rod member 24 in a counterclockwise direction, as viewed in Fig. 1, the cushions 37 may be simultaneously adjusted downwardly and inwardly toward each other. I find that this adjustment, combined with the adjustment of bracket unit B, for height, upon straps 11, provides any desired degree of adjustment for both height and lateral spacing of the cushions. Normally, the head of a short person is slightly smaller than the head of a tall person, and in adjusting the cushions downwardly and inwardly it is often possible to provide suitable adjustment for both head width and height, without varying the adjustment of bracket member B upon straps 11. However, where necessary, the height adjustment may be supplemented by shifting bracket member B.

Figs. 10, 11 and 12 illustrate how the supporting unit A and bracket unit B can be fabricated from stamped sheet metal. In this modification of the invention, the straps 11a are of flanged channel section, having a central channel portion 41 and marginal flanges 42, the latter adapted to lie against the surface of seat back 10 and the channel 41 projecting outwardly to provide space to receive hooks 43, 43' of bracket unit B', the hooks 43, 43' being inserted into lanced slots 21a therein.

Clamp jaws 17a, 18a are of stamped sheet metal, with grooves 23a embossed therein, and with hooks 43, 43' formed integrally with the jaw 18a. A bolt 22a, extending through openings in the jaws, provides for clamping the jaws against rods 24.

Figs. 13 and 14 disclose a further modification of the invention, similar to that shown in Figs. 10, 11 and 12, but utilizing tongues 43a instead of the hooks 43' of Fig. 10. Fig. 13 illustrates how the hooks 43 and tongues 43a are integrally formed at the four corners of the rear clamping jaw 18d. Other parts correspond to parts shown in Figs. 1–12, as indicated by the use of the same reference numerals.

I claim:

1. In a head rest for automobiles, a supporting unit including hook means to embrace and rest upon the upper portion of a seat back; a pair of clamp jaws carried by said hook means and having therein registering pairs of arcuate grooves arranged in adjacent, concentric relation with the outer portions of the grooves inclined upwardly; a pair of arcuate arms slidably received in said grooves and having upwardly extending outer end portions; clamp screw means for tightening said clamping jaws against said arms for securing them in any adjusted position; and head rest cushions carried by said arms.

2. Apparatus as defined in claim 1, wherein said clamp screw means comprises a single clamp screw extending between said adjacent concentric grooves.

3. Apparatus as defined in claim 1, including bearing blocks secured to the upper ends of said arms, a screw stud extended through each bearing block and having at one end a head engaging one side of the bearing block, and a yoke pivotally connected to said head and mounting a respective cushion, the pivotal axis of said yoke being at right angles to the pivotal axis of said stud, whereby to provide a universal connection between a respective arm and a respective cushion.

4. In a head rest for automobiles, a supporting unit comprising a pair of straps each having an upper end portion of hook shape to receive and rest upon the upper portion of a seat back; lazy tong means connecting the lower ends of said straps for maintaining them in parallel relationship while allowing collapsing of the straps to side by side association; a mounting unit comprising a pair of clamp jaws and means at the respective ends of one of said jaws for detachably connecting the same to the respective straps when the latter are spread apart; said clamp jaws each having a pair of radially spaced, adjacent coaxial arcuate grooves with the grooves of one jaw registering with those of the other, and with the outer portions of the grooves inclined upwardly; a pair of arcuate arms received in the respective grooves and having upwardly extending outer end portions; a clamp screw coacting with said jaws to clamp the same against said arms in any adjusted position thereof; and head rest cushions carried by the upper ends of the respective arms.

5. In a head rest apparatus for an automobile, a supporting unit comprising a pair of straps each having an upper end portion in the form of a hook to receive and rest upon the upper portion of a seat back, each of said straps having a number of key-hole slots arranged along the length thereof; a mounting unit comprising a pair of clamp jaws one of which has at its respective ends, headed studs receivable in said key-hole slots and adapted to lock therein for supporting said one jaw upon said straps, said jaws each having a pair of radially spaced, concentric arcuate grooves with the grooves of one jaw registering with those of the other and with the outer portions of the grooves inclined upwardly; a pair of arcuate arms received between the jaws and slidable in respective grooves, said arms having upwardly extending outer end portions; a clamp screw extending between said arms and operative to draw said jaws into clamping engagement with said arms for locking them in any adjusted position; and a pair of head rest cushions carried by the respective arms at their upper ends.

6. Apparatus as defined in claim 5, including bearing blocks carried by the respective arms at their upper ends, studs rotatably mounted in said bearing blocks, a yoke pivotally attached to one end of each respective stud, a nut threaded on the other end of each stud and adapted to lock the same to the respective bearing blocks, said yoke mounting a respective cushion, the axis of the yoke pivot being at right angles to the axis of the stud, whereby to provide a universally pivotal connection between each cushion and its respective supporting arm.

RACHEL L. RISING.

References Cited in the file of this patent

UNITED STATES PATENTS

| Number | Name | Date |
| --- | --- | --- |
| 27,806 | Howell | Apr. 10, 1860 |
| 77,043 | Hunt | Apr. 21, 1868 |
| 522,192 | Browne | July 3, 1894 |
| 792,669 | Schaff | June 20, 1905 |
| 793,681 | Ritter | July 4, 1905 |

FOREIGN PATENTS

| Number | Country | Date |
| --- | --- | --- |
| 107,922 | Austria | Nov. 10, 1927 |